March 24, 1931.  C. J. PENDER  1,797,673
CANE SLICER AND LEVELER ATTACHMENT FOR SUGAR MILL ROLLS
Filed Dec. 7, 1929  2 Sheets-Sheet 1
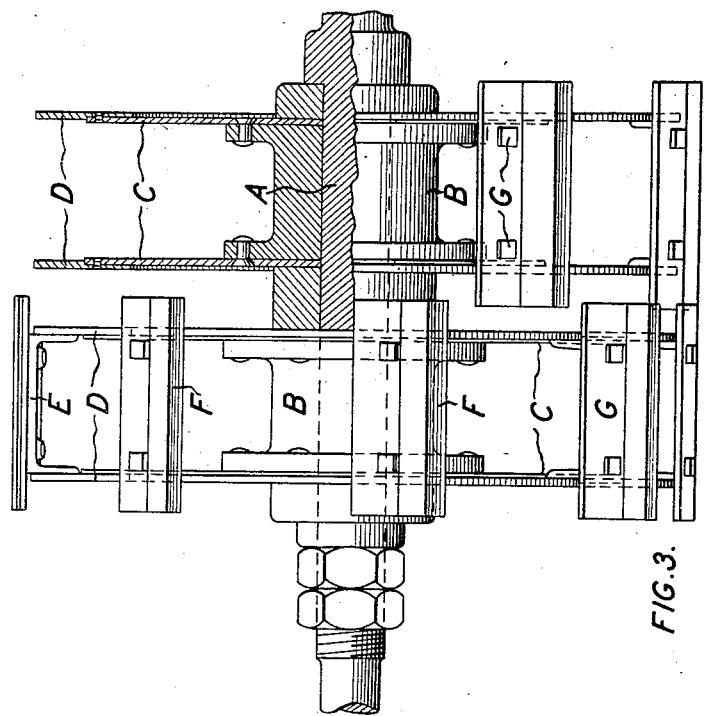
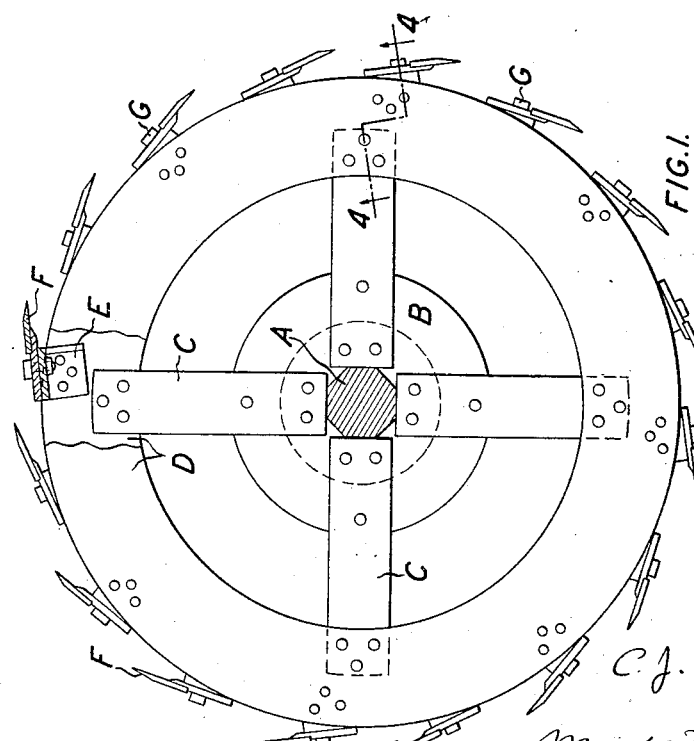

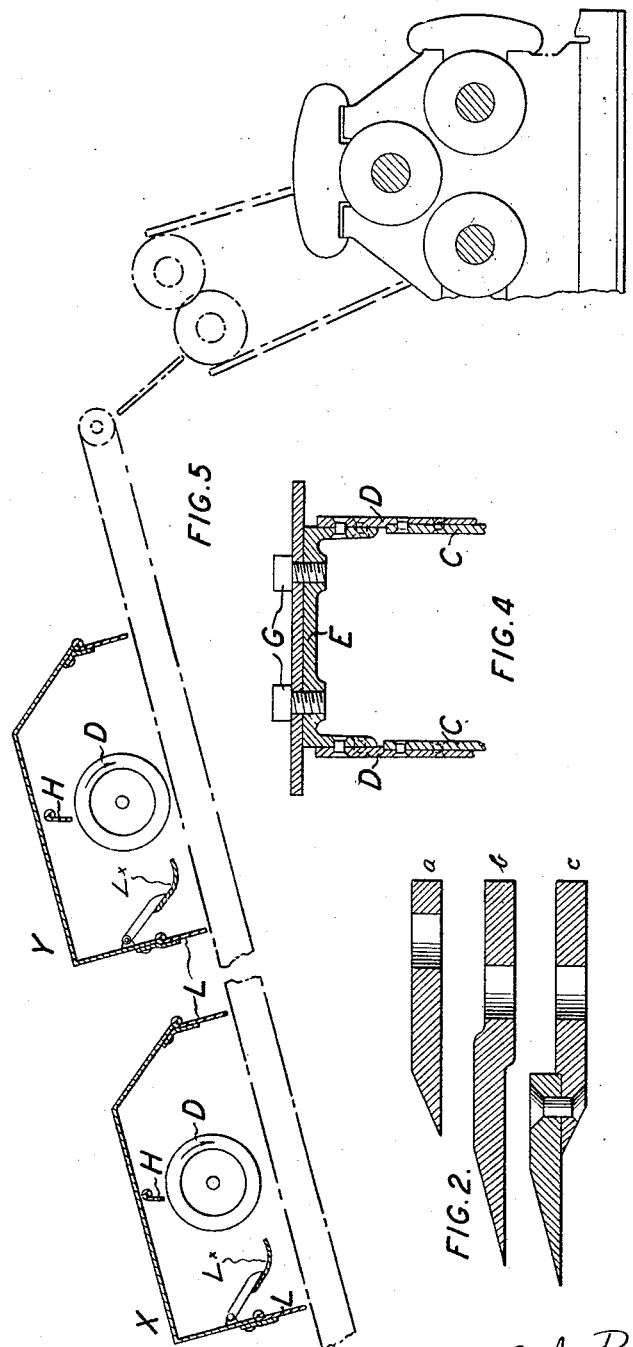

Patented Mar. 24, 1931

1,797,673

UNITED STATES PATENT OFFICE

CULBERT JAMES PENDER, OF LAUTOKA, FIJI ISLANDS

CANE SLICER AND LEVELER ATTACHMENT FOR SUGAR-MILL ROLLS

Application filed December 7, 1929, Serial No. 412,349, and in Australia January 11, 1929.

This invention consists in improved means for leveling and slicing the incoming matted mass of sugar cane to prepare it for crushing in a roller mill, thus to render it more amenable to treatment in the mill, to equalize the feed, and to fully utilize the mill capacity.

Cane levelers heretofore known consist of gangs of revolving knives operating above the feed carrier in alignment with the course of the feed; these knives are so disposed that they divide and carve the mass of cane in the direction of its movement towards the rolls and procure some leveling of the feed. Another type of device for like purposes utilizes gangs of intermeshing disc cutters which also operate in alignment with the course of the feed; these cutters operate to carve and divide the cane in the direction of the incoming feed. Another type of known apparatus consists in a pair of intermeshing patterned or grooved rolls between which the feed is caused to pass; these rolls bruise and crack the cane into short lengths and they are so designed and are so set that in the crushing which the cane suffers as little juice as possible is liberated. Hammers or stampers or disintegrator beaters have also been used to bruise the cane and produce a loose mat of irregularly broken feed. It is well known to sugar engineers that any such preparatory treatment of the cane results in better extraction of the juice from the cane in the crusher rolls and also results in enlargement of the throughput, but the known devices for slicing and leveling are not satisfactory as they do not effect the desirable reduction of the canes and uniform leveling of the feed approaching the mill rolls.

The device in which the present invention consists is broadly distinguished from all the known devices; it operates to effect complete opening up of the cell structure of the cane and uniform "leveling" of the feed, and it brings about a marked reduction in the power required for driving and it materially augments the mill throughput.

This device may be fitted at any position in the cane circuit leading to the mill, but it is preferable that two of these devices be used, both of them located in the feed race which leads up to the front of the first rolls. It is preferred that one of them be positioned at some distance from the delivery end of the feed race, and the other near the receiving end of the feed race.

The device consists of a plurality of revolving wheel cutters disposed side by side on the same shaft, the shaft mounted for rotation across the carrier and above it. Each of these cutters comprises a hub which is keyed to the shaft, spokes radiating from the hub carrying a pair of felloes, and a series of knife blades fixed peripherally across the felloes, and spaced symmetrically. Discs may be substituted for the spokes and felloes, in which case the knife blades are fixed to the disc peripheries. The number of revolving wheel cutters varies according to the width of the carrier. It is important that the design should be rugged, and that the knives should be short rather than long; hence in the case of a wide carrier three or more revolving wheel cutters should be used to make up the width. It would be practicable, but for obvious reasons it would be undesirable, to use only one wheel cutter instead of two or more wheel cutters disposed side by side. The knives are chisel edged and they are demountably fixed to the felloes or discs so as to facilitate removal for sharpening and replacement.

The approaching matted mass of cane is brought up to the device on its way to the mill on the usual carrier or conveyor which is fitted in the feed race, and the revolving knives slice the cane across its length as it reaches them, and deliver slicings and fragments of cane fairly evenly on the conveyor, and distributes them so that a leveled feed goes to the chute hopper which delivers the feed to the rolls. The cutters are chisel-edged blades; in length they measure 12 to 15 inches, but they might be shorter or longer. The direction of rotation may be positive or negative. When it is positive, the knives cut down on the feed, but when the direction of drive is negative, the knives strike upwardly across the leading ends of the mass of tangled canes advancing towards the mill. The knives may be disposed helically across the felloes or discs to which they are demountably attached so as to effect a more or less angular cut instead of a straight-across cut. It is necessary to fit a hood above and around each of the devices to deflect back into the carrier any cane pieces which are thrown outward by the knives. When the direction of rotation is negative and the cane is short in length it is advantageous to fit a hanging baffle in front of the device; this hanging baffle trails on the cane on the carrier as the cane passes under it and compacts the cane pieces and prevents the lifting of short lengths of uncut cane over the device. A vertical baffle fitted above the device also functions to arrest pieces of uncut cane.

The device is fitted so that there is more or less clearance between the bottom of it and the bed of the feed race. In practice, a clearance of about one-half inch is most desirable. The most effective arrangement which has been tested out in practice utilizes two of these devices operating in series. The first one (X Fig. 5) is set with a clearance of 10 inches to 24 inches above the floor of the carrier depending on the height at which cane is delivered onto it. The most effective clearance is that which permits this first device X to produce that amount of cuttings which suffices to fill the voids in the mass of cane which passes it. The second device, (Y Fig. 5) which is near the mill, is set with very low clearance—preferably less than one inch above the floor of the carrier. With this arrangement a nearly perfect division and leveling of the feed is obtained.

The diameter of the felloes or discs which form the frames of the cutter heads may be about three feet more or less; an effective driving speed has been found to be about 400 to 500 revolutions per minute subject to appropriate variation according to the diameter and the speed of revolution, the desirable peripheral speed being about 5000 to 6000 feet per minute. The device is set athwart the feed race, and it is unnecessary that all the individual canes should approach it endwise; it will slice and level cane irrespective of the direction in which the individual canes are presented to the knives. The device subdivides the cane into relatively small slices and sawdust-like particles ready for the mill. Of the cuttings, some pass under the knives into the spaces intermediate the knives, and are thrown off, others cling to the underface of the knives for a fraction of a second before flying off, these latter cuttings have a noticeable self-sharpening effect by slightly wearing away the underside of the knives. The cuttings are thrown off with great force and are mostly projected forwardly by the centrifugal action and the wind caused by the revolving motion. Some of the cuttings are thrown on the front side of the device, these are brought forward to it again by the on-coming cane. The more desirable direction of drive is negative, that is to say, with the knives striking upwardly toward the baffles, against the advancing mass of cane; but good results are also obtained with a positive drive, in which the knives strike downwardly.

Eight knives, more or less, are spaced peripherally around the felloes or discs. The knives are chisel-edged and are detachably secured to the felloes or discs, and in order that the nuts or heads of the holding-on bolts or studs will not stand proud of the cutting faces, it is preferred that the cutters shall be joggled in section so that the plane of the leading edge stands above flush of the nuts or stud heads which seat upon downstepped butt portions of the blades.

I am not aware of any cane slicer or leveler device which may be driven in the negative direction, that is with knives sweeping backward and upward against the advancing cane. An advantage is obtained by the negative drive, as, when the drive is negative, short lengths of cane cannot be drawn underneath as when running positively, but are pushed backwards amongst the oncoming cane, and then as the mass comes forward they again encounter the knives.

In the accompanying drawings:—

Fig. 1 is an end elevational view of the device;

Fig. 2 transverse sections through three different patterns of knives;

Fig. 3 is a front elevational view of one cutter head of the device;

Fig. 4 is a fragmentary transverse section on the plane 4—4, Fig. 1; and

Fig. 5 is a longitudinal sectional elevation showing the device fitted to a mill feed race.

A is a shaft, B a hub thereon, C spokes radiating from the hub B, D two flat rings (or maybe discs) carried on the hub B and spaced apart about 8 inches to 9 inches when using knives about 12 inches long. E are channel section bridges or knife holders which cross connect the rings DD, to which their flanges are riveted. About eight such bridges spaced equidistant are fitted. The outside diameter measurement of the rings D is about 3 feet more or less. On each of the bridges a knife is fixed by screw pins or any other means. The knives should be fixed demountably, as it is necessary to remove them from time to time for re-sharpening. The edges of the knives F set proud of the peripheral edges of the rings D, and the bolt nuts or stud heads G should set within the circle swept by the knife edges in order to prevent them from bashing the cane. If parallel faced knives (a Fig. 2) are used, this back-setting of the bolt or pin heads requires the grinding of the knives to a bluffer angle and the tilting of the knives at a steeper angle than that suggested in Fig. 1. Preferably the knives are joggled in section as shown at $b$ Fig. 2, or they are fixed to butts, $c$ Fig. 2, the butts setting back, as seen in Fig. 1. A sufficient number of cutter heads is mounted side by side on the shaft to span the width of carrier, a clearance of about 1 inch being allowed between the knife ends and the sides of the carrier.

The direction of rotation may be either positive or negative, but is preferably negative—that is to say the cutters strike upwardly towards the incoming feed. Baffles L and H are fitted only when the rotation is negative, the baffle $L^x$ holds the top pieces of cane down and neutralizes the tendency of the knives to lift them and the baffle H prevents short lengths being thrown over.

If the drive is in the positive direction there is a tendency for all short cane (also for long lengths of cane after they have been cut short) that is about the same height on the carrier as the knives when in their lowest position, to be drawn under and thrown forward without being properly sliced up.

The device constituted of the requisite number of cutter heads with knives, mounted on a driving shaft, is an open skeleton structure through which the cane slices and fragments cut by the knives may pass freely. The majority of the cuttings are thrown forward towards the mill, others are thrown upwards and others backwards. The slices and fragments thrown backwards fall into the oncoming cane and are brought up to the knives again, suffering further reduction and are ultimately thrown forward towards the mill.

At sugar mills where high and low fibred canes are milled, the former sometimes containing 15% fibre and the latter 8% or 9%, it is difficult to set the mills to crush both efficiently. If the mill openings are set to suit the low fibred canes, the high fibred ones pull the mill up, and conversely if the settings are made to suit the high fibred canes the low fibred ones pass through the mills without being crushed efficiently. In some mills this difficulty is met by mixing high fibred cane with low fibred cane, but this is not always convenient even when there are facilities for mixing.

Trials have proved that with this apparatus the cane is finely divided and that little extra horse power is consumed in crushing high fibred cane above that required in the milling of low fibred canes.

What I claim as my invention and desire to secure by Letters Patent is:—

Apparatus for leveling and slicing sugar cane including a feed race, a supporting shaft mounted transversely of the feed race, a plurality of skeleton frames carried by the shaft, each frame comprising a plurality of thin spaced plates connected together, said frames being arranged side by side on the shaft throughout the width of the feed race, a plurality of knives carried in spaced relation on the periphery of each frame having cutting edges disposed parallel to the axis of said shaft, the knives of each frame extending a distance laterally of the latter and into close relation with the knives of the adjacent frame affording a space between the frames for the passage of material, the knives being substantially flat and disposed obliquely to a plane passing radially through the axis of the shaft and the knives whereby the centrifugal force acting on the material carried around with the rotating knives causes said material to be thrown outwardly.

In testimony whereof I affix my signature.

CULBERT JAMES PENDER.